United States Patent
Pant et al.

(10) Patent No.: US 9,857,921 B2
(45) Date of Patent: Jan. 2, 2018

(54) INPUT SIGNAL CORRECTION ARCHITECTURE

(75) Inventors: Vivek Pant, San Jose, CA (US); Shahrooz Shahparnia, Campbell, CA (US); Adam Schwartz, Redwood City, CA (US)

(73) Assignee: Synaptics Incorporated, San Jose, CA (US)

( * ) Notice: Subject to any disclaimer, the term of this patent is extended or adjusted under 35 U.S.C. 154(b) by 406 days.

(21) Appl. No.: 13/107,703

(22) Filed: May 13, 2011

(65) Prior Publication Data

US 2012/0287077 A1    Nov. 15, 2012

(51) Int. Cl.
  G06F 3/044    (2006.01)
  G06F 3/041    (2006.01)

(52) U.S. Cl.
  CPC ............ G06F 3/044 (2013.01); G06F 3/0418 (2013.01)

(58) Field of Classification Search
  CPC ....................................................... G06F 3/044
  USPC ................................. 345/173–178; 178/18.06
  See application file for complete search history.

(56) References Cited

U.S. PATENT DOCUMENTS

| | | | |
|---|---|---|---|
| 5,543,590 A * | 8/1996 | Gillespie ................. | G06F 3/041 178/18.06 |
| 6,452,514 B1 | 9/2002 | Phillipp | |
| 6,621,487 B2 | 9/2003 | Iwasaki et al. | |
| 7,288,946 B2 * | 10/2007 | Hargreaves ........ | G01R 27/2605 324/678 |
| 7,692,494 B2 | 4/2010 | Ogino et al. | |
| 8,049,732 B2 | 11/2011 | Hotelling et al. | |
| 8,553,004 B2 | 10/2013 | Hotelling et al. | |
| 8,599,167 B2 | 12/2013 | Joharapurkar et al. | |
| 8,766,939 B2 * | 7/2014 | Sobel .................... | G06F 3/0416 178/18.06 |
| 2002/0011991 A1 | 1/2002 | Iwasaki et al. | |
| 2007/0074913 A1 * | 4/2007 | Geaghan ................ | G06F 3/044 178/18.06 |
| 2008/0157876 A1 * | 7/2008 | Tsuyoshi .................. | H03F 1/34 330/294 |
| 2008/0162996 A1 | 7/2008 | Krah et al. | |
| 2008/0162997 A1 | 7/2008 | Vu et al. | |
| 2009/0153152 A1 | 6/2009 | Maharyta et al. | |
| 2009/0244014 A1 | 10/2009 | Hotelling et al. | |
| 2009/0315851 A1 | 12/2009 | Hotelling et al. | |
| 2010/0110040 A1 * | 5/2010 | Kim ..................... | G06F 3/0412 345/174 |

(Continued)

OTHER PUBLICATIONS

Kim, et al., "ISSCC 2010 Session 6 Displays & Biomedical Devices, 6.1", https://submissions.miracd.com/ISSCC2010/WebAP/PDF/AP_Session6.pdf, (2010),Section 6.1

*Primary Examiner* — Chad Dicke
(74) *Attorney, Agent, or Firm* — Osha Liang LLP

(57) ABSTRACT

A capacitive input device processing system comprises input signal correction circuitry. The input signal correction circuitry includes an amplifier, a correction signal generator, and a charge collection mechanism. The amplifier is configured to receive a combination signal. The combination signal comprises a resulting signal from a sensor element and a correction charge. The correction signal generator is configured to generate a correction signal. The charge collection mechanism is configured to accumulate the correction charge from the correction signal.

11 Claims, 9 Drawing Sheets

(56) References Cited

U.S. PATENT DOCUMENTS

| | | | | |
|---|---|---|---|---|
| 2010/0328262 A1* | 12/2010 | Huang | ............... | G06F 3/0416 |
| | | | | 345/174 |
| 2011/0122089 A1* | 5/2011 | Kobayashi | ............. | G06F 3/044 |
| | | | | 345/174 |
| 2011/0261006 A1* | 10/2011 | Joharapurkar | ........ | G06F 3/0416 |
| | | | | 345/174 |
| 2011/0261007 A1* | 10/2011 | Joharapurkar | ........ | G06F 3/0418 |
| | | | | 345/174 |
| 2011/0267309 A1* | 11/2011 | Hanauer | ............... | G06F 3/0416 |
| | | | | 345/174 |
| 2011/0273399 A1* | 11/2011 | Lee | ...................... | G06F 3/0418 |
| | | | | 345/174 |
| 2012/0021822 A1 | 1/2012 | DeWaal et al. | | |
| 2014/0049501 A1* | 2/2014 | Santos | ................... | G06F 3/044 |
| | | | | 345/174 |
| 2016/0004354 A1* | 1/2016 | Kremin | ................. | G06F 3/044 |
| | | | | 345/174 |

\* cited by examiner

800

```
AMPLIFY A FIRST RESULTING SIGNAL CONVEYED BY A SENSOR
ELEMENT TO AN INPUT OF THE INPUT SIGNAL PROCESSING
CIRCUITRY, WHEREIN THE FIRST RESULTING SIGNAL IS AMPLIFIED
INTO AN OUTPUT SIGNAL BY THE INPUT SIGNAL PROCESSING
CIRCUITRY
810
         ↓
ANALYZE THE OUTPUT SIGNAL
820
         ↓
OPERATE A CORRECTION SIGNAL GENERATOR TO PRODUCE A
CORRECTION SIGNAL
830
         ↓
ACCUMULATE A CORRECTION CHARGE FROM THE CORRECTION
SIGNAL
840
         ↓
PROVIDE THE CORRECTION CHARGE TO THE INPUT OF THE INPUT
SIGNAL PROCESSING CIRCUITRY SUCH THAT THE CORRECTION
CHARGE IS COMBINED WITH A SECOND RESULTING SIGNAL
850
```

FIG. 8A

INPUT SIGNAL CORRECTION ARCHITECTURE

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

A capacitive input device processing system comprises input signal correction circuitry. The input signal correction circuitry includes an amplifier, a correction signal generator, and a charge collection mechanism. The amplifier is configured to receive a combination signal. The combination signal comprises a resulting signal from a sensor element and a correction charge. The correction signal generator is configured to generate a correction signal. The charge collection mechanism is configured to accumulate the correction charge from the correction signal.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments of the present invention and, together with the Description of Embodiments, serve to explain principles discussed below, where like designations denote like elements, and:

FIGS. 8A and 8B show a flow diagram of an example method of operating a capacitive input device, in accordance with various embodiments.

DESCRIPTION OF EMBODIMENTS

The following Description of Embodiments is merely provided by way of example and not of limitation. Furthermore, there is no intention to be bound by any expressed or implied theory presented in the preceding technical field, background, brief summary or the following detailed description.

Overview of Discussion

Herein, various embodiments are described that provide input devices, processing systems, and methods that facilitate improved usability. In various embodiments described herein, the input device may be a capacitive sensing device. Embodiments associated with an input signal correction architecture, are described herein, by which a resulting signal received from a sensor element of an input device may be adjusted in the charge domain prior to being amplified by an integrating amplifier. Adjusting the resulting signal prior to amplification can improve the signal to noise ratio achieved during the amplification. Additionally or alternatively, as described herein, embodiments allow for the gain of the integrating amplifier to be adjusted to improve amplification by preventing saturation of the amplifier which results in clipping of an amplified signal.

Embodiments described herein contrast in several ways with conventional signal offsetting/adjusting approaches that correct or adjust an amplified signal from a sensor element. For example, conventional approaches which offset or adjust an amplified signal have their effectiveness limited by the existing signal to noise ratio (SNR) that is inherent in the amplified signal. Moreover, conventional approaches differ from embodiments described herein by operating in different domains such as a voltage or current domains, rather than in a charge domain. For at least these reasons, it would not be obvious for one of ordinary skill in the art to utilize, build from, extend, or take inspiration from concepts of conventional signal correction approaches in order to arrive at the techniques described herein.

Discussion begins with a description of an example input device with which or upon which various embodiments described herein may be implemented. An example sensor element pattern is then described. This is followed by description of an example processing system and some components thereof. The processing system may be utilized with an input device, such as a capacitive sensing device. Examples of non-uniform sensor baseline patterns are described. Discussion then turns to description of how adjustments to a feedback capacitor and/or a baseline correction charge collection device and/or its charging signal) may be adjusted based on an output signal of a processing system. Operation of the processing system, and several components thereof, is then further described in conjunction with description of a method of operating a capacitive input device.

Example Input Device

Figure 1:
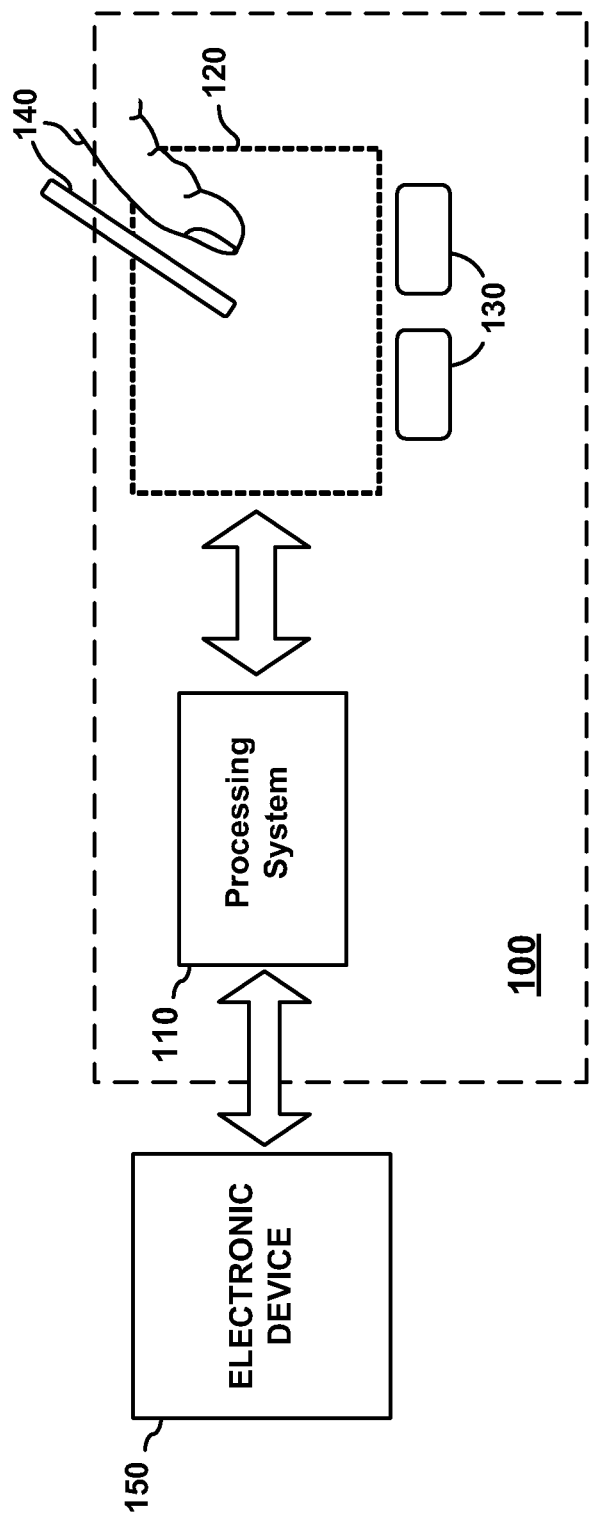
FIG. 1 is a bloc diagram of an example input device, in accordance with embodiments.

Turning now to the figures, FIG. 1 is a block diagram of an exemplary input device 100, in accordance with embodiments of the invention. Input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

Input device 100 can be implemented as a physical part of the electronic system, or can be physically separate from the electronic system. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Associafron (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g. a touch surface) of the input device 100, contact with an input surface of input device 100 coupled with some amount of applied force or pressure, and/ora combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in the sensing region 120. Input device 100 comprises one or more sensing elements for detecting user input. As anonlimiting example, input device 100 may use capacitive techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive. In some embodiments, one or more receiver electrodes may be operated to receive a resulting signal when no transmitter electrodes are transmitting (e.g., the transmitters are disabled). In this manner, the resulting signal represents noise detected in the operating environment of sensing region 120.

In FIG. 1, a processing system 110 is shown as part of input device 100. The processing system 110 is configured to operate the hardware of input device 100 to detect input in the sensing region 120. Processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, processing system 110 responds to user input (or lack of user input) in sensing region 120 directly by causing one or more actions. Example actions include changing operation modes, as well as GUI actions such as cursor movement, selection, menu navigation, and other functions. In some embodiments, processing system 110 provides information about the input (or lack of input) to some part of the electronic system (e.g. to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 comprises a touch screen interface, and sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other tangible storage technology.

Example Sensor Element Pattern

Figure 2:
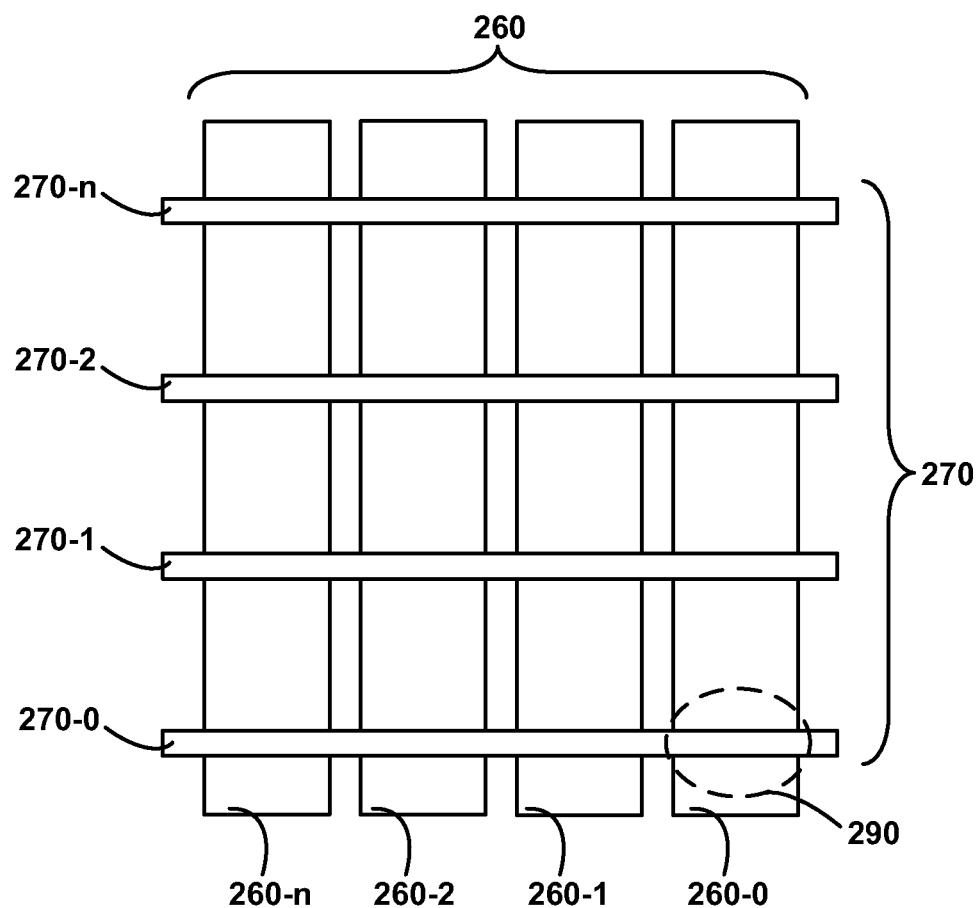
FIG. 2 shows a portion of an example sensor electrode pattern which may be utilized in a sensor to generate all or part of the sensing region of an input device, according to some embodiments.

FIG. 2 shows a portion of an example sensor electrode pattern 200 which may be utilized in a sensor to generate all or part of the sensing region of an input device, according to various embodiments. For purposes of clarity of illustration and description, a non-limiting simple rectangular sensor electrode pattern 200 is illustrated. It is appreciated that numerous other sensor electrode patterns may be employed.

The illustrated sensor electrode pattern is made up of a plurality of receiver electrodes 270 (270-0, 270-1, 270-2 . . . 270-n) and a plurality of transmitter electrodes 260 (260-0, 260-1, 260-2, . . . 260-n) which overlay one another, in this example. In the illustrated example, touch sensing pixels are centered at locations where transmitter and receiver electrodes cross. Capacitive pixel 290 illustrates one of the capacitive pixels generated by sensor electrode pattern 200. It is appreciated that in a crossing sensor electrode pattern, such as the illustrated example, some form of insulating material or substrate is typically disposed between transmitter electrodes 260 and receiver electrodes 270. However, in some embodiments, transmitter electrodes 260 and receiver electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

Example Processing System

Figure 3:
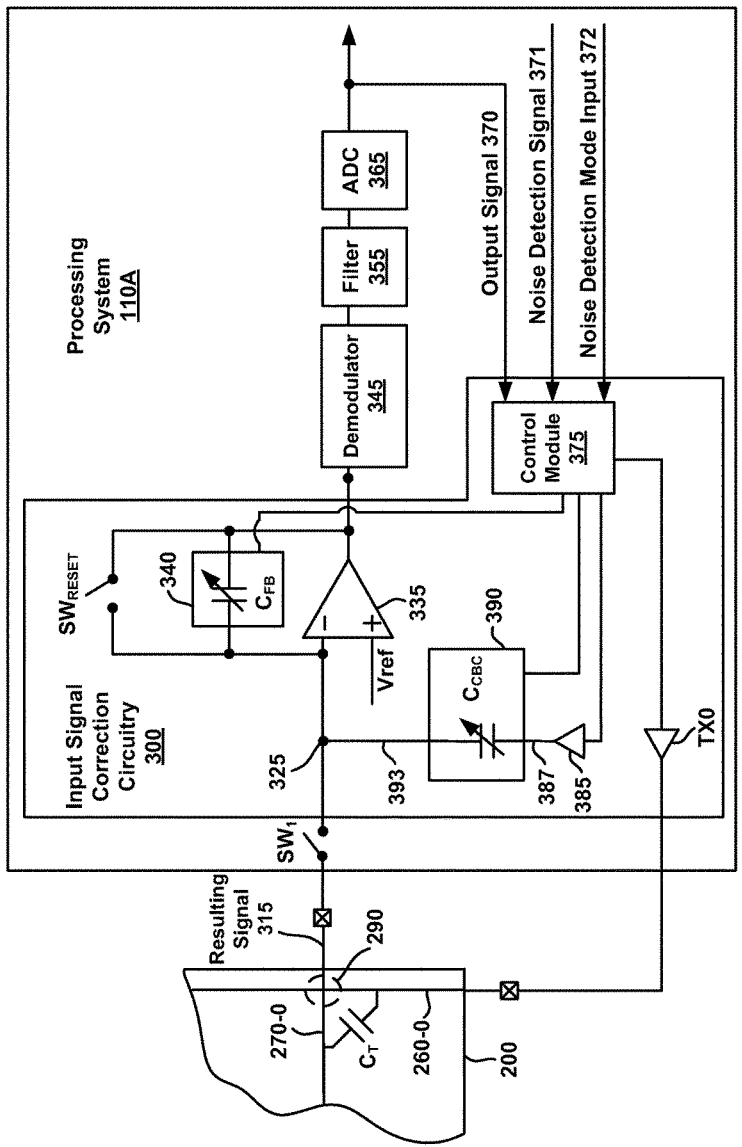
FIG. 3 illustrates a block diagram of some components of an example processing system that may be utilized with an input device, according to various embodiments.

FIG. 3 illustrates a block diagram of some components of an example processing system 110A that may be utilized with an input device (e.g., in place of processing system 110 as part of input device 100), according to various embodiments. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with transmitter electrode(s) and receiver electrode(s) that implement a sensing region 120 of an input device 100. In one embodiment, of input device 100, processing system 110A includes, among other components: input signal correction circuitry 300, a demodulator 345, a filter 355, and an analog to digital converter (ADC) 365. In some embodiments, input signal correction circuitry 300 may include: an integrating amplifier 335, a feedback charge collection mechanism 340, a control module 375, a charge correction signal generator 385, and a charge collection mechanism 390. Processing system 110A may be coupled with sensor elements of a sensor electrode pattern, such as sensor electrode pattern 200.

A portion of sensor electrode pattern 200 is illustrated in FIG. 3. The inverting input of amplifier 335 is shown coupled with receiver electrode 270-0. Receiver electrode 270-0 is a sensor element which conveys a resulting signal indicative of input in a sensing region 120. Driver TX-0, of processing system 110A is shown coupled with transmitter electrode 260-0. Processing system 110A may be similarly coupled with additional receiver electrodes 270 and transmitter electrodes 260, which may involve the use of additional drivers and duplication of portions of input signal correction circuitry 300. In some embodiments, processing system 110A and the input device 100, of which it is a part, may be disposed in or communicatively coupled with an electronic device 150, such as a display device, computer, or other electronic device.

Input signal correction circuitry 300 operates to adjust a resulting signal that is received by processing system 100A from a sensor element such as receiver electrode 270-0. For example, a resulting signal 315 may be received from receiver electrode 270-0, in some instances the resulting signal 315 occurs in response to a transmitter signal being driven on transmitter electrode 260-0 by driver TX-0. Control module 375 or other portion(s) of processing system 110A may control the amplitude, phase, and/or transmission or ceasing of transmission of the transmitter similar on transmitter electrode 260-0. Transmitter signals on other transmitter electrodes 260 (not illustrated, in FIG. 3) of sensor electrode pattern 200 may be controlled in a similar or identical manner. Resulting signal 315 is a charge, and is thus in the charge domain.

Resulting signal 315 flows to the inverting input of integrating amplifier 335, integrating amplifier 335 integrates and amplifies resulting signal 315 and couples its output to demodulator 345. Integrating amplifier 335 also couples its output back to its inverting input, as feedback, through feedback charge collection mechanism 340 which is coupled, between the output and the inverting input of integrating amplifier 335. In some embodiments, charge collection mechanism 340 may be a fixed, non-adjustable capacitor. In some embodiments, charge collection mechanism 340 comprises an adjustable capacitance. For example, charge collection mechanism 340 may include a bank of a plurality of capacitors which can be selected in various combinations to achieve any of a variety of capacitance values. A reset switch $SW_{RESET}$ is coupled in parallel with feedback charge collection mechanism 340, and can be closed to reset integrating amplifier 335.

Demodulator 345 demodulates an amplified signal received from integrating amplifier 335 and then couples this amplified demodulated signal to filter 355 for filtering. After filtering by filter 355 a demodulated and filtered amplified signal is converted from an analog signal to a digital output signal 370 by analog to digital converter 365. Output signal 370 may be used by other portions of processing system 110A for determining input(s) via sensor electrode pattern 200. Output signal 370 is also utilized as an input to control module 375. Although output signal 370 is depicted as being taken from the output of ADC 365, in some embodiments output signal 370 may be taken from other locations within input signal correction circuitry 300, including: the output of integrating amplifier 335, the output of demodulator 345, or the output of filter 355. In some embodiments, a noise detection signal 371 is also an input to control module 375. Noise detection signal 371 may be indicative of a high noise environment being sensed by a noise sensing module (not pictured). Based on output signal 370, and in some embodiments upon noise detection signal 371 (either separately or in combination), control module 375 controls one or more of: a correction signal 387 generated and output from correction signal generator 385 (e.g., type, amplitude, offset, and/or phase of correction signal 387); charge collection value (capacitance) of coarse baseline correction charge collection mechanism 390; and charge collection value of feedback charge collection mechanism 340.

In some embodiments, a noise detection mode input 372 is also an input to control module 375. For example, noise detection mode input 372 may communicate to control module 375 that no transmitter signal is being transmitted relative to a receiver electrode that a resulting signal 315 is being sensed from. This means that the resulting signal 315 does not include an effect due to an input object. Rather, in this "blanking mode," resulting signal 315 only reflects noise induced signal, and can thus be utilized to determine an amount of noise which may be eliminated in a future resulting signal 315 which is measured when a transmitter signal is driven relative to a sensed upon receiver electrode.

When noise detection mode input 372 is present and all or a portion of input device 100 is operating in a blanking mode, control module 375 may utilize different settings for charge collection mechanism 390, charge collection mechanism 340, and/or correction signal 387, than the settings used when input device 100 is operating in an input object sensing mode.

In some embodiments, charge collection mechanism 390 may be a fixed, non-adjustable capacitor. In some embodiments, charge collection mechanism 390 comprises an adjustable capacitance. For example, charge collection mechanism 390 may include a bank of a plurality of capacitors which can be selected in various combinations to achieve any of a variety of capacitance values. Charge collection mechanism 390 accumulates a correction charge 393 from correction signal 387. Correction charge 393 is then coupled to the inverting input of integrating amplifier 335 where it combines with a second (later in time) resulting signal 315 to adjust the resulting signal into a combination signal 325. The charge component of correction charge can add to or subtract charge from resulting signal 315 as the two signals merge to form combination signal 325. Combination signal 325 is then amplified by integrating amplifier 335 and output, demodulated, filtered, and converted to a digital signal in the manner previously described.

In some embodiments, output signal 370 my be received once as an input by control module 375, and then a correction signal 387 is set and/or a charge collection value of charge collection mechanism 390 is set; all following resulting signals 315 are then adjusted in a similar fashion according to these settings. Similarly, the charge collection value of feedback charge collection mechanism 340 may be adjusted only once in response to an output signal 370 received once as an input by control module 375. In some embodiments, one or more of these adjustment processes is performed intervals. In some embodiments, one or more of these adjustment processes is continual. In some embodiments, one or more of these adjustment processes may switch from being performed once or at intervals to being performed continually or at greater intervals based on a second input to control module 375, such as an input from noise detection signal 371 that indicates a high noise operating environment exists.

Adjusting the charge collection capacity of charge collection mechanism 390 and adjusting the amplitude and/or phase of correction signal 387 are tools for shaping combination signal 325. Adjusting the charge collection capacity of charge collection mechanism 390 adjusts the amount of correction charge 393 which can be provided to form a combination signal 325. Correction signal 387 may be any alternating waveform, such as a square, triangle, or sine wave. Adjusting the amplitude and/or phase of correction signal 387 facilitates adjusting the amplitude of resulting signal 315, as correction charge 393 and resulting signal 315 are combined to form combination signal 325. Thus, adjusting the amplitude and/or phase of correction signal 387 facilitates adjusting the amplitude of combination signal 325.

Control module 375, in some embodiments, analyzes output signal 370 and changes a gain of amplifier 335 based on a parameter of output signal 370. For example, if output signal 370 is found to be clipping, gain may be reduced; while if output signal 370 is found to have a very small amplitude, gain may be increased. Adjusting the charge collection capacity of charge collection mechanism 340 allows control module 375 to adjust the gain of amplifier 335. For example, by decreasing this feedback capacitance, gain of amplifier 335 is increased; and by increasing this feedback capacitance gain is decreased.

It is appreciated that correction charge 393 may be combined with resulting signal 315 on either the left or right side of switch $SW_1$. However, it has been shown that in "self-capacitive" systems, when combination occurs on the right side (i.e., on the side closest to the input of amplifier 335) a greater effect is imparted and additionally the adjustments which can be made to resulting signal 315 in self-capacitive systems are larger. It is appreciated that such adjustments can be made to compensate for high or low resulting signals and to add to or subtract out a baseline transcapacitance for a capacitive channel or a single capacitive pixel.

A resulting signal 315 is made up of at least two components: actual signal which is a measured change due to an input object (and may include a noise component); and an offset which is caused by the inherent baseline transcapacitance, $C_t$, which exists within a capacitive sensor of an input device 100 even when an input object is not present in a sensing region 120 of the input device 100. For example, variations of this baseline transcapacitance may occur due to manufacturing variations resulting in an inconsistent $C_t$ on some channels than on other channels of a capacitive sensor. This can sometimes cause a capacitive sensor to be unusable if the $C_t$ is too large or has too much variation among channels or pixels. Typically, only the measured change in the resulting signal due to an input object is "of interest," but conventionally it is amplified along with the entire offset caused by $C_t$. This $C_t$ offset can limit the range of amplification by amplifier 335 before clipping occurs. By creating a combination signal 325 that reduces or eliminates this $C_t$ offset prior to amplification and/or by adjusting gain of the amplifier, control module 375 can avoid saturation of amplifier 335 and also improve siinials to noise ratio. Moreover, even in a situation where saturation is not an issue, by creatin a combination signal 325 that reduces or eliminates $C_t$ offset while simultaneously increasing gain, control module 375 attains greater amplification of the of interest portion of the resulting signal.

Non-limiting Examples of Non-Uniform Sensor Baseline Transcapacitances

In FIG. 3, capacitive pixel 290 is visible. Capacitive pixels such as capacitive pixel 290 inherently have a baseline transcapacitance, $C_t$. In general, it is desirable to have fairly a uniform $C_t$ across the pixels of a capacitive sensor pattern. While this may be a design objective, in practice the baseline transcapacitances often are not uniform due to variations in manufacturing and other factors. This baseline transcapacitance is a part of any resulting signal that is measured from a respective pixel or channel (where a channel comprises one or more pixels that are associated with a receiver electrode and from which a resulting signal is measured). Because of this, the baseline transcapacitance(s) create an offset in any resulting signal 315. In addition to manufacturing variations, there are other ways in which a sensor can have a $C_t$ which nominally exceeds the input dynamic range of an amplifier and/or processing system. For example, this can occur if a transmitter signal voltage is boosted relative to the receiver supply voltage. Additionally, sometimes the sensor design simply has a large $C_t$. Some examples of baseline transcapacitance are illustrated in FIGS. 4 and 5.

Figure 4:
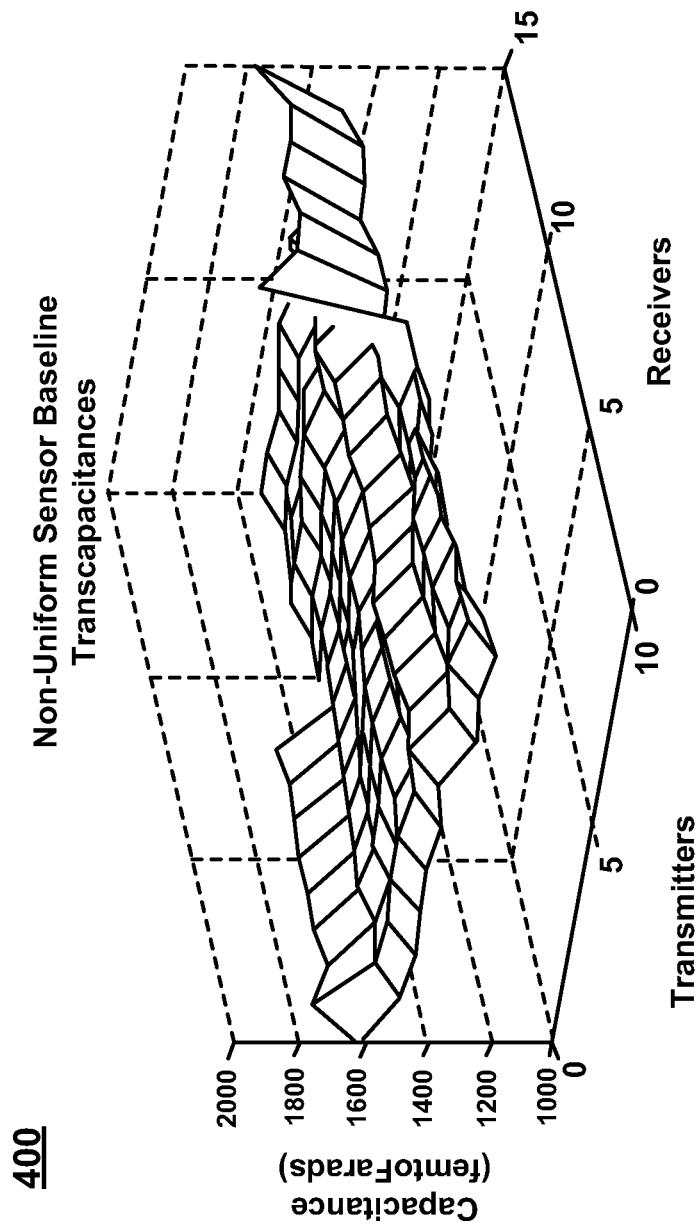
FIG. 4 illustrates a first example of a non-uniform sensor baseline transcapacitances, according to an embodiment.

FIG. 4 illustrates a first example of a non-uniform sensor baseline transcapacitances, according to an embodiment.

Graph 400 illustrates a baseline for a sensor electrode pattern disposed and shows that baseline transcapacitances can vary by several hundred femtoFarads across the sensor.

Figure 5:
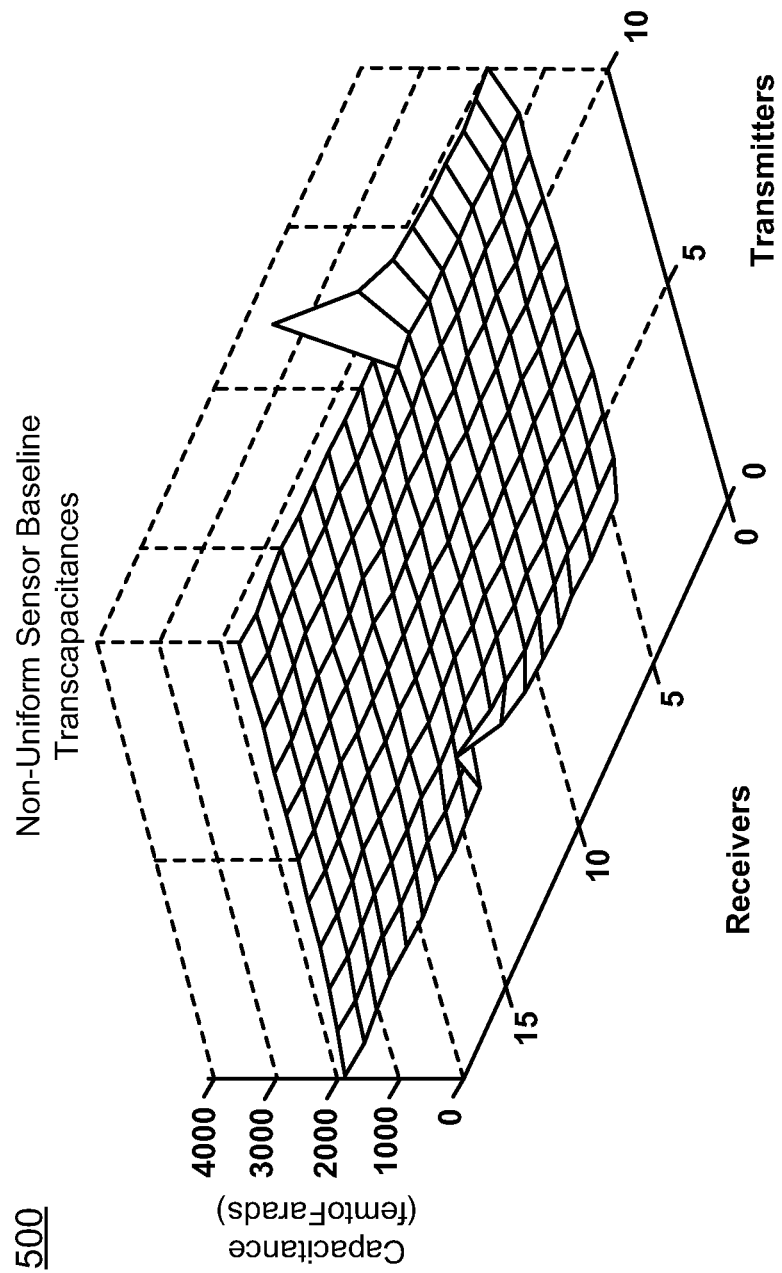
FIG. 5 illustrates a second example of a non-uniform sensor baseline transcapacitances, according to an embodiment.

FIG. 5 illustrates a second example of a non-uniform sensor baseline transcapacitances, according to an embodiment. Graph 500 illustrates a baseline for a sensor electrode pattern and shows that baseline transcapacitances can vary significantly. Specifically, FIG. 5 shows an average $C_t$=1.67 pF and peak $C_t$=3.87 pF, techniques described herein, control module 385 and input signal correction circuitry 300, in one embodiment, can operate to subtract 2 pF from the baseline of the maximum pixel or of every pixel, thus lowering the maximum pixel to a baseline $C_t$ of about 1.87 pF. Accordingly, this would also allow a charge collection value of $C_{FB}$ (charge collection mechanism 340) to be reduced (for example from 16 pF to 12 pF thus providing approximately a 2 dB SNR improvement in amplifier 335). Accordingly, it should be appreciated and evident that through use of such an adjustment technique, some sensors which may have been rejected as outside of tolerance, for example due to manufacturing defects which caused previously unacceptable variations in baseline capacitance or unacceptably large variations between channels or pixels, may now become useable, it is appreciated that a baseline adjustment can be performed on a per pixel basis or on a per channel basis by raising or lowering the baseline for a pixel or a channel.

Determination of Charge Collection Values and Gain Settings

In discussion of how control module 375 may adjust charge collection values of charge collection mechanisms 340 and 390 and adjust gain of amplifier 335, several exemplary variables will utilized. These variables are described in Table 1 below.

TABLE 1

| Variables | |
|---|---|
| $C_{CBC}$ | The signal adjustment capacitance applied via charge collection mechanism 390 and correction signal 387. |
| $C_t^{min} \equiv \min_{i,j} C_t(i,j)$ | The minimum pixel capacitance of a sensor, where i and j are coordinates in the form of a transmitter electrode (i) and a receiver electrode (j) which form a capacitive pixel. |
| $C_t^{max} \equiv \max_{i,j} C_t(i,j)$ | The maximum pixel capacitance of a sensor. |
| $\hat{C}_t \equiv C_t^{max} - C_t^{min}$ | The spread in the baseline capacitance within a sensor. |
| $\hat{C}_{ref} \equiv C_{ref}^{HI} - C_{ref}^{LO}$ | Reference capacitances define a preset dynamic range within which input system circuitry is designed to operate, and are bounded by hi and low values. Typically reference capacitance values are selected or preset at time of manufacture. The dynamic range of the input signal, is thus configured by these high ($C_{ref}^{HI}$) and low ($C_{ref}^{LO}$) capacitance values. |
| $\overline{C}_t \equiv \dfrac{C_t^{max} + C_t^{min}}{2}$ | The average of the maximum and minimum baseline capacitances within a sensor. |
| $\overline{C}_{ref} \equiv \dfrac{C_{ref}^{HI} + C_{ref}^{LO}}{2}$ | The average of the input signal range configured by setting high ($C_{ref}^{HI}$) and low ($C_{ref}^{LO}$) capacitance values. |

TABLE 1-continued

| Variables | |
|---|---|
| $G \equiv \dfrac{C_{FB}^{max}}{C_{FB}^{Rx}}$ | The front-end gain of amplifier 335 as defined by the feedback charge collection mechanism 340. |

To understand how control module 375 selects the appropriate values for the $C_{CBC}$ capacitance it is useful to understand how the choice of $C_{CBC}$ may be calculated. For this purpose define $$C_t^{CBC} \equiv (C_t - C_{CBC})G \quad (1)$$

to represent the effective measured capacitance after baseline correction and amplification gain. Two conditions must be met to prevent clipping:

$$C_t^{CBC,max} \equiv (C_t^{max} - C_{CBC})G \le C_{ref}^{HI} \quad (2)$$

$$C_t^{CBC,min} \equiv (C_t^{min} - C_{CBC})G \le C_{ref}^{LO} \quad (3)$$

Subtracting (3) from (2) results in the condition either:

$$G \le \dfrac{\hat{C}_{ref}}{\hat{C}_t} \quad \text{or} \quad (4a)$$

$$C_{Rx}^{FB} \ge \dfrac{\hat{C}_t \cdot C_{FB}^{max}}{\hat{C}_{ref}} \quad (4b)$$

Taken together, (2) and (3) imply:

$$C_t^{max} - \dfrac{1}{G}C_{ref}^{HI} \le C_{CBC} \le C_t^{min} - \dfrac{1}{G}C_{ref}^{LO} \quad (5)$$

Condition (5) means $C_{CBC}$ must be big enough to get the maximum $C_t$ below the high reference, but not so big as to push the minimum $C_t$ below the low reference. Conditions (4a) and (5) must be met with the discrete set of possible values for $C_{CBC}$ and G. Note that if there is again, G, which satisfies (4a), then (5) has a solution for that gain. Equation (5) doesn't say how to choose $C_{CBC}$, it just gives the acceptable range. A choice for $C_{CBC}$ is to find the value nearest to the middle of the bounding terms. That is, control module 375 may choose the available value of $C_{CBC}$ that most closely solves:

$$CBC \approx \overline{C}_t - \dfrac{1}{G}\overline{C}_{ref} \quad (6)$$

Until this point there has been no discussion of the impact of the discrete set of $C_{CBC}$ values on equations (4) and (6). Equation (4) assumes that the $C_{CBC}$ can center the baseline between the reference caps. However, because there are only a discrete set of $C_{CBC}$ values which can be selected by control module 375, the baseline cannot be perfectly centered. Therefore, the actual gain that can be applied will be less than suggested by (4).

The accuracy with which $\overline{C}_t$ can be centered depends on the resolution, $\Delta\Delta_{CBC}$, of the $C_{CBC}$ values. Given a quantized resolution, equation (4) becomes $$G \leq \frac{\hat{C}_{ref} - \text{margin}}{\hat{C}_t + \Delta_{CBC}} \quad (7)$$

where margin≈1-2 pF is needed to insure that interference does not cause clipping. For instance, if common-mode noise is present, in some embodiments control module 375 is able to remove it. However, the common mode noise cannot be removed if it caused clipping. Thus, the $C_{CBC}$ resolution impacts how much gain can be applied.

Consider a case where margin is 1 dB, $\hat{C}_{ref}$=4 pF and $\hat{C}_t$=1.5 pF. If $\Delta_{CBC}$=1 pF, then the maximum gain is G≤6/5. Since $C_{Rx}^{FB}$ is a discrete set of selectable capacitors, for example 16 pF and 12 pF. In such an example, according to (4b), a gain of G=1 may be all that can be achieved. However, if $\Delta_{CBC}$=0.5 pF, the maximum gain could be G=3/2. With $C_{Rx}^{FB}$=12 pF a gain, G=4/3, can be achieved. Thus, from this simplified, and non-limiting example, it can illustrated that a $\Delta_{CBC}$=0.5 pF is a good compromise between implementation complexity and usefulness of the $C_{CBC}$ offset. To help solidify these concepts, two examples are provided with reference to FIGS. 6 and 7.

Figure 6:
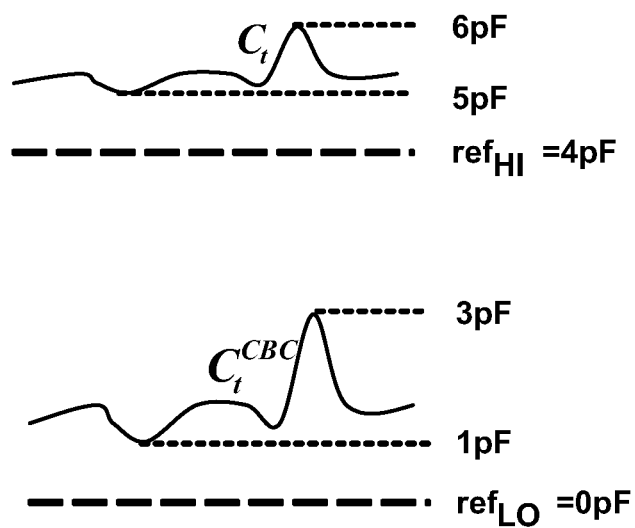
FIG. 6 illustrates an example of calculating gain for a signal in which the nominal baseline is outside the input dynamic range, according to an embodiment.

FIG. 6 illustrates a first example of calculating gain for a signal in which the nominal baseline $C_t$ is outside the input dynamic range, according to an embodiment. In this first example, the following definitions apply:

$G = 2$ $\overline{C}_t = 5.5 \text{ pF}$ $\overline{C}_{ref} = 2 \text{ pF}$ $\therefore CBC = 5.5 \text{ pF} - \frac{2 \text{ pF}}{2} = 4.5 \text{ pF}$ As illustrated, $C_t$ ranges from about 5 to 6 pF, and is above 4 pF. In this example, the gain is calculated to be 2 and the $C_{CBC}$ offset is 4.5 pF, which brings the resulting signal back into an acceptable dynamic range.

Figure 7:
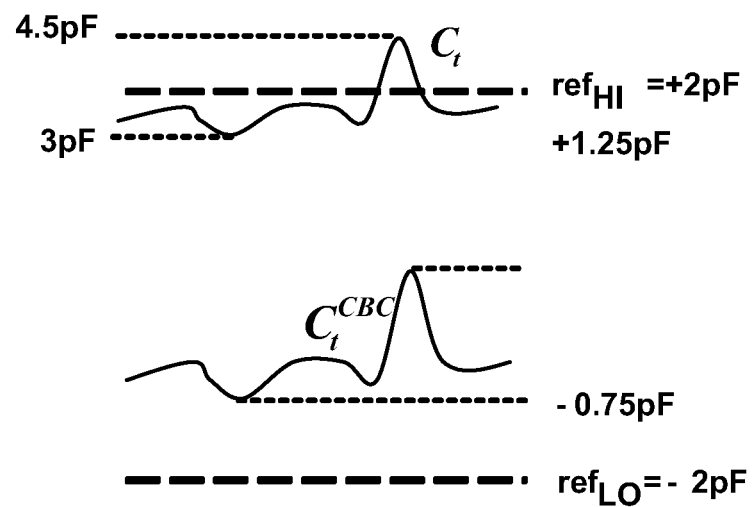
FIG. 7 illustrates an example where gain is adjusted to increase signal to noise ratio (SNR) where $C_f$ for a capacitive pixel exceeds a baseline for a sensing channel, according to an embodiment.

FIG. 7 illustrates an example where gain is adjusted to increase signal to noise ratio (SNR) where $C_t$ for a capacitive pixel exceeds a baseline for a sensing channel, according to an embodiment.

$G = 1.333$ $\overline{C}_t = 3.75 \text{ pF}$ $\overline{C}_{ref} = 2 \text{ pF}$ $\therefore CBC = 3.75 \text{ pF} - \frac{2 \text{ pF}}{2} = 3.5 \text{ pF}$ In example 2, a pixel exceeds the reference channel so $C_{CBC}$ is used to bring the $\overline{C}_t$ to 0.25 pF; this allows control module 375 to increase the SNR. This also allows control module 375 to set $C_{ref}^{HI}$=+4 pF in which case G=2 could be used and $C_{CBC}$=0.5 pF or 1.0 pF. For purposes of this example, it can be assumed that $C_{CBC}$ has a 0.5 pF resolution. Because of this limit in resolution, it is not possible to get the baseline perfectly centered at 0 pF.

A third example involves operation of control module 375 in the presence of blank clusters that can be present in a blanking mode of operation of an input device. Blank clusters are resulting signals which are generated while associated transmitters electrodes are not transmitting (e.g., sensing on receiver electrode 270-1 while driver TX-0 is disabled and not transmitting on transmitter electrode 260-1). During blank clusters, an input object signal is not preset and it is, therefore, more straightforward to measure noise. When the transmitters are disabled, the measured $C_t$=0 pF. Suppose in this example that the reference capacitors are set to 0 pF/4 pF. Then, without baseline correction, amplifier 335 would clip on the low side during blank clusters. One option is to change the reference channels during the blank clusters and then back again during the normal sensing, but this would cause the reference channels to have a transient. Instead, in this example the clipping can be eliminated by control module 375 setting $C_{CBC}$=−2 pF during the blank clusters. In one embodiment, control module 375 makes such an adjustment when noise detection mode input 372 indicates that processing system 110A is sensing on blank clusters. It is appreciated that blank cluster noise sensing requires an initial offset voltage measurement with the receiver input switch, $SW_1$, open. Therefore, in order for this scheme to work the control module 375 needs to inject charge on the integrating amplifier side of $SW_1$.

In some embodiments, $C_{CBC}$ (capacitance/charge collection value of charge collection mechanism 390) can be set in a range such as ±{0-6} pF. If more area can be used for $C_{CBC}$ in the footprint of an ASIC or other integrated circuit, using additional capacitors can provide for greater range and finer resolution. Similarly if less area in the footprint of an ASIC or other integrated circuit is available for $C_{CBC}$, then fewer capacitors and fewer control bits may be utilized. In a minimum implementation a single capacitor, which could be selected or not selected, could be employed.

Example Method of Operation

Figure 8B:
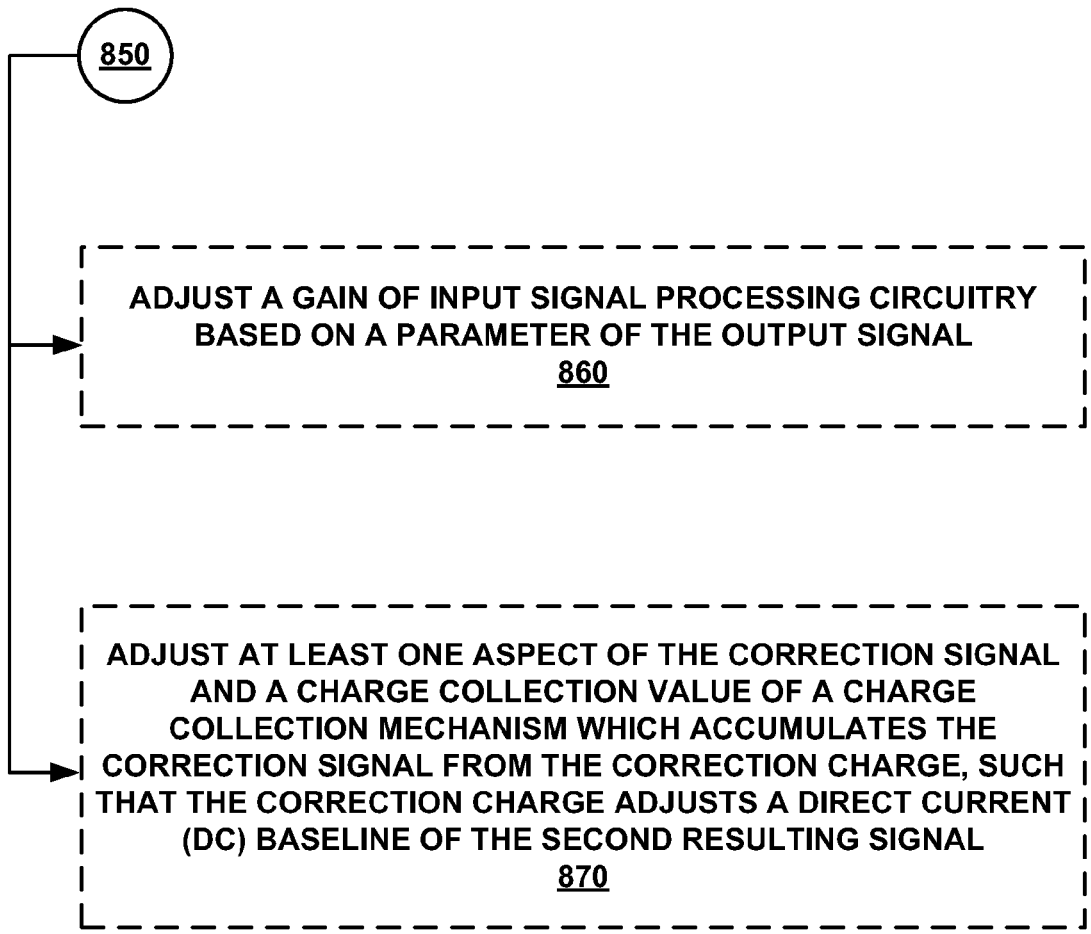

FIGS. 8A and 8B illustrate a flow diagram of an example method of operating a capacitive input device, in accordance with various embodiments. For purposes of illustration, during the description of flow diagram 800, reference will be made to components of input device 100 of FIG. 1 and processing system 110A and circuitry of FIG. 3. In some embodiments, not all of the procedures described in flow diagram 800 are implemented. In some embodiments, other procedures in addition to those described may be implemented. In some embodiments, procedures described in flow diagram 800 may be implemented in a different order than illustrated, and/or described.

At 810 of flow diagram 800, in one embodiment, a first resulting signal 315 is amplified. The first resulting signal 315 is conveyed by a sensor element such as receiver electrode 270-0 to an input, such as switch $SW_1$ or the inverting input of amplifier 335 of input signal processing circuitry such as processing system 110A. The first resulting signal 315 is received at a first point in time and is amplified into an output signal 370 by the input signal processing circuitry.

At 820 of flow diagram 800, in one embodiment, output signal 370 is analyzed. For example, in one embodiment, output signal 370 is received as an input by control module 375. The amplitude can be analyzed by control module 375 to determine it is too low (an indicator that amplification gain and/or baseline of a second resulting signal 315 could be increased) or too high (an indication of saturation of amplifier 335 meaning that gain could be decreased and/or baseline of a second resulting signal 315 could be decreased).

At 830 of flow diagram 800, in one embodiment, a correction signal generator 385 is operated to produce a correction signal 387. This may comprise control module 375 controlling the operation of correction signal generator 385. For example, based on the analysis of output signal 370, control module 375 can selectively control one or more of an amplitude of correction signal 387, a phase of correction signal 387, and the type of wave form (e.g., square, triangle, sine, etc.) of correction signal 387.

At 840 of flow diagram 800, in one embodiment, a correction charge 393 is accumulated from correction signal 387. Correction charge 393 is accumulated, such as by charge collection mechanism 390.

At 850 of flow diagram 800, in one embodiment, correction charge 393 is provided to the input of the input signal processing circuitry such that the correction charge is combined with a second resulting signal 315. With reference to FIG. 3, in one embodiment, correction charge 393 is coupled with an input of amplifier 335 on the integrating amplifier's side of switch $SW_1$ (right side of $SW_1$ in FIG. 3). The second resulting signal 315 occurs at a second, later point in time, from the first resulting signal 315. Thus, second resulting signal 315 may be an entirely different signal from first resulting signal 315 or may be a later portion of the first resulting signal 315. The combination of second resulting signal 315 and correction charcze 393 form combination signal 325.

At 860 of flow diagram 800, in one embodiment, the method further includes adjusting a gain of the input signal processing circuitry based on a parameter of the output signal. As previously described, the gain can be adjusted downward to avoid clipping/saturation and upward to increase amplification. For example, in case where the baseline of a second resulting signal 315 is decreased amplification may simultaneously be increased. Control module 375 adjusts gain of amplifier 335 via adjustment of the capacitance of charge collection mechanism 340 to reduce feedback capacitance and increase gain or to increase feedback capacitance and reduce gain.

At 870 of flow diagram 800, in one embodiment, the method further includes adjusting at least one aspect of the correction signal and a charge collection value of a charge collection mechanism which accumulates the correction signal from the correction charge, such that the correction charge adjusts a Direct Current (DC) baseline of the second resulting signal. For example, amplitude and/or phase of correction signal 387 can be adjusted in concert with adjustment of the capacitance value of charge collection mechanism 390 in order to adjust the baseline of the second resulting signal upward or downward through the creation of combination signal 325.

Thus, the embodiments and examples set those herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A capacitive input device processing system comprising:
    an amplifier comprising an input and an output, the amplifier being coupled to a plurality of receiver electrodes of a capacitive input device and configured to:
        receive, at the input of the amplifier, a first resulting signal from a receiver electrode of the plurality of receiver electrodes,
            wherein the first resulting signal comprises a baseline transcapacitance and a measured change in capacitance due to an input object within a sensing region of the capacitive input device,
        amplify the first resulting signal to generate a first output signal at the output of the amplifier, wherein amplification of the first resulting signal results in clipping of the first output signal, and
        amplify a combined signal comprising a second resulting signal to generate a second output signal at the output of the amplifier, wherein amplification of the combined signal does not result in clipping of the second output signal;
    a charge collection mechanism coupled to the input of the amplifier, the charge collection mechanism configured to accumulate a correction charge that is applied to the second resulting signal to obtain the combined signal at the input of the amplifier, wherein application of the correction charge reduces the effects of the baseline transcapacitance in the combined signal;
    a correction signal generator coupled to the charge collection mechanism, the correction signal generator configured to generate a correction signal that produces the correction charge using the charge collection mechanism;
    an adjustable feedback capacitor coupled to a control module, the input of the amplifier, and the output of the amplifier; and
    a control module coupled to the correction signal generator, the charge collection mechanism, the adjustable feedback capacitor, and the output of the amplifier, the control module configured to:
        analyze, the first output signal from the output of the amplifier,
        detect, based on the analysis, that the first output signal is clipping,
        generate, using the correction signal generator and the charge collection mechanism and in response to detecting clipping of the first output signal, the correction signal that produces the correction charge, and
        based on the reduction of the effects of the baseline transcapacitance via application of the correction charge, reduce a feedback capacitance of an adjustable feedback capacitor to increase the gain provided to the second resulting signal by the amplifier to improve a signal to noise ratio of a second output signal from the output of the amplifier.

2. The capacitive input device processing system of claim 1, wherein the control module is further configured to adjust a charge collection value of the charge collection mechanism.

3. The capacitive input device processing system of claim 2, wherein the control module adjusts the charge collection value based on the first output signal of the amplifier.

4. The capacitive input device processing system of claim 2, wherein the control module adjusts the charge collection value in response to the capacitive input device operating in a noise detection mode.

5. The capacitive input device processing system of claim 1, wherein the amplifier is an integrating amplifier.

6. The capacitive input device processing system of claim 1, wherein the control module is further configured to adjust at least one of an aspect of the correction signal and a charge collection value of the charge collection mechanism, such that the correction charge modifies an amplitude of the second resulting signal.

7. A capacitive input device comprising:
a plurality of transmitter electrodes;
a plurality of receiver electrodes;
an amplifier comprising an input and an output, the amplifier being coupled to the plurality of receiver electrodes and configured to:
  receive, at the input of the amplifier, a first resulting signal from a receiver electrode of the plurality of receiver electrodes,
    wherein the first resulting signal comprises a baseline transcapacitance and a measured change in capacitance due to an input object within a sensing region of the capacitive input device,
  amplify the first resulting signal to generate a first output signal at the output of the amplifier, wherein amplification of the first resulting signal results in clipping of the first output signal, and
  amplify a combined signal comprising a second resulting signal to generate a second output signal at the output of the amplifier, wherein amplification of the combined signal does not result in clipping of the second output signal;
a charge collection mechanism coupled to the input of the amplifier, the charge collection mechanism configured to accumulate a correction charge that is applied to the second resulting signal to obtain the combined signal at the input of the amplifier, wherein application of the correction charge reduces the effects of the baseline transcapacitance in the combined signal;
a correction signal generator coupled to the charge collection mechanism, the correction signal generator configured to generate a correction signal that produces the correction charge using the charge collection mechanism;
an adjustable feedback capacitor coupled to a control module, the input of the amplifier, and the output of the amplifier; and
a control module coupled to the correction signal generator, the charge collection mechanism, the adjustable feedback capacitor, and the output of the amplifier, the control module configured to:
  analyze, the first output signal from the output of the amplifier,
  detect, based on the analysis, that the first output signal is clipping,
  generate, using the correction signal generator and the charge collection mechanism and in response to detecting clipping of the first output signal, the correction signal that produces the correction charge, and
  based on the reduction of the effects of the baseline transcapacitance via application of the correction charge, reduce a feedback capacitance of an adjustable feedback capacitor to increase the gain provided to the second resulting signal by the amplifier to improve a signal to noise ratio of a second output signal from the output of the amplifier.

8. The capacitive input device of claim 7, wherein the control module is further configured to adjust a charge collection value of the charge collection mechanism based on the first output signal of the output of the amplifier.

9. The capacitive input device of claim 8, wherein the control module is further configured to adjust the charge collection value in response to the capacitive input device operating in a noise detection mode.

10. The capacitive input device of claim 7, wherein the control module is further configured to adjust at least one of an aspect of the correction signal and a charge collection value of the charge collection mechanism, such that the correction charge modifies an amplitude of the second resulting signal.

11. A method of operating a capacitive input device, the method comprising:
analyzing, at a control module coupled to an output of an amplifier, a first output signal from the output of the amplifier, wherein the first output signal comprises a first resulting signal amplified by the amplifier, and wherein the first resulting signal comprises a baseline transcapacitance and a measured change in capacitance due to an input object within a sensing region of the capacitive input device;
detecting, based on the analysis, that the first output signal is clipping;
generating, using a correction signal generator coupled to the control module and a charge collection mechanism and in response to detecting clipping of the first output signal, a correction signal that produces a correction charge
generating a combined signal by applying the correction charge to a second resulting signal at an input of the amplifier, wherein application of the correction charge reduces the effects of the baseline transcapacitance in the combined signal; and
based on the reduction of the effects of the baseline transcapacitance via application of the correction charge, reducing a feedback capacitance of an adjustable feedback capacitor to increase the gain provided to the second resulting signal by the amplifier to improve a signal to noise ratio of a second output signal from the output of the amplifier, wherein the adjustable feedback capacitor is coupled to the input of the amplifier and the output of the amplifier, and wherein the second output signal is not clipping.

* * * * *